United States Patent [19]

Buzsaki

[11] Patent Number: 5,890,127
[45] Date of Patent: Mar. 30, 1999

[54] METHOD AND APPARATUS FOR PERFORMING A LOOP RESET IN A PROCESS MODELING SYSTEM

[75] Inventor: George Buzsaki, Fremont, Calif.

[73] Assignee: Oracle Corporation, Redwood Shores, Calif.

[21] Appl. No.: 865,269

[22] Filed: May 29, 1997

[51] Int. Cl.⁶ .................................................. B64G 7/00
[52] U.S. Cl. .................................................. 705/1; 707/1
[58] Field of Search .......................... 705/1, 7, 11; 707/1, 707/103; 395/200.47, 200.49

[56] References Cited

U.S. PATENT DOCUMENTS 5,592,661  1/1997  Eisenberg et al. ...................... 707/104

*Primary Examiner*—Thomas Peeso
*Attorney, Agent, or Firm*—Blakely, Sokoloff, Taylor & Zafman LLP

[57] ABSTRACT

A system is provided for resetting a process from a first activity to a second activity, in which the second activity was previously performed. The system identifies activities that were previously performed after the second activity. Each identified activity (including the second activity) is then executed in a cancel mode of operation. The execution of the activities is performed sequentially from the first activity to the second activity. The system then executes the second activity in a run mode of operation. The cancel mode of operation cancels the changes that were implemented by a particular activity during a previous execution of the activity. The activities can maintain information regarding the last change implemented by the activity, which is used by the activity in the cancel mode of operation to cancel the last change implemented by the activity. The system may include a loop reset counter associated with the first activity and the second activity. The loop reset counter controls the number of loop resets that can occur from the first activity to the second activity.

24 Claims, 11 Drawing Sheets

ITEM ACTIVITY STATUS TABLE

| PROCESS NAME | PROCESS INSTANCE | PROCESS ACTIVITY | ACTIVITY STATUS | ACTIVITY RESULT | ERROR ENCOUNTERED |
|---|---|---|---|---|---|
| REQUISITION APPROVAL | 001 | A | COMPLETED | | |
| REQUISITION APPROVAL | 001 | B | COMPLETED | | |
| REQUISITION APPROVAL | 001 | C | COMPLETED | APPROVER IDENTIFIED | |
| REQUISITION APPROVAL | 001 | D | COMPLETED | | |
| REQUISITION APPROVAL | 001 | E | COMPLETED | | |
| REQUISITION APPROVAL | 001 | F | NOT PERFORMED | | |
| REQUISITION APPROVAL | 001 | G | NOT PERFORMED | | |
| REQUISITION APPROVAL | 001 | H | NOT PERFORMED | | |
| REQUISITION APPROVAL | 001 | I | NOT PERFORMED | | |

FIG. 6A

ITEM ACTIVITY STATUS TABLE

| PROCESS NAME | PROCESS INSTANCE | PROCESS ACTIVITY | ACTIVITY STATUS | ACTIVITY RESULT | ERROR ENCOUNTERED |
|---|---|---|---|---|---|
| REQUISITION APPROVAL | 001 | A | COMPLETED | | |
| REQUISITION APPROVAL | 001 | B | COMPLETED | | |
| REQUISITION APPROVAL | 001 | C | NOT PERFORMED | | |
| REQUISITION APPROVAL | 001 | D | NOT PERFORMED | | |
| REQUISITION APPROVAL | 001 | E | NOT PERFORMED | | |
| REQUISITION APPROVAL | 001 | F | NOT PERFORMED | | |
| REQUISITION APPROVAL | 001 | G | NOT PERFORMED | | |
| REQUISITION APPROVAL | 001 | H | NOT PERFORMED | | |
| REQUISITION APPROVAL | 001 | I | NOT PERFORMED | | |

FIG. 6B

ITEM ACTIVITY STATUS TABLE

| PROCESS NAME | PROCESS INSTANCE | PROCESS ACTIVITY | ACTIVITY STATUS | ACTIVITY RESULT | ERROR ENCOUNTERED |
|---|---|---|---|---|---|
| REQUISITION APPROVAL | 001 | A | COMPLETED | | |
| REQUISITION APPROVAL | 001 | B | COMPLETED | | |
| REQUISITION APPROVAL | 001 | C | COMPLETED | | |
| REQUISITION APPROVAL | 001 | D | COMPLETED | APPROVER IDENTIFIED | |
| REQUISITION APPROVAL | 001 | E | COMPLETED | | |
| REQUISITION APPROVAL | 001 | F | COMPLETED | REQUISITION APPROVED | |
| REQUISITION APPROVAL | 001 | G | COMPLETED | | |
| REQUISITION APPROVAL | 001 | H | NOT PERFORMED | | |
| REQUISITION APPROVAL | 001 | I | NOT PERFORMED | | |

METHOD AND APPARATUS FOR PERFORMING A LOOP RESET IN A PROCESS MODELING SYSTEM

FIELD OF THE INVENTION

The present invention relates to a system for modeling a process. More specifically, the invention provides a system for performing a loop reset in a process modeling system.

BACKGROUND

Various types of processes, such as business processes, can be modeled and controlled by a computer-based system. For example, a process modeling engine can be used to automate a business process by controlling the activities associated with the business process from start to finish. Business processes can range from a simple two-step process to a complex process involving a large number of steps and parallel paths of execution. Exemplary process modeling engines can control the process of approving a requisition, approving a hiring decision, or processing an expense report submitted by an employee.

In some processes, there are situations in which the flow of activities does not proceed linearly from start to finish. Instead, it may be necessary to direct the process back to a previously executed activity and restart the process from that previous activity. This process of returning to a previously executed activity may be referred to as a "loop reset." A loop reset may occur, for example, in a requisition approval process when the process identifies that several invalid entries are contained in the requisition. The invalid entries may include incorrect item numbers, incorrect account codes, or incorrect department information. In this example, the requisition approval process rejects the entire requisition with an instruction to complete another requisition with corrected entries. The process described in this example must be restarted from the beginning.

In other situations, it may be desirable to restart a process from an intermediate location rather than the beginning of the process. For example, in a requisition approval process, the process may return to an intermediate activity (i.e., perform a loop reset) if an incorrect item number was provided. Rather than restarting the entire process, it returns to the intermediate step of identifying an item number and sends a message to the user to enter a corrected item number. Thus, instead of completing a new requisition form, the user merely corrects the single error in the existing form. When performing a loop reset to an intermediate activity, problems arise when one or more activities have already been completed after the activity to which the process is being reset (referred to as the "reset point"). For example, in the requisition approval process discussed above, one or more activities may have been performed after the user entered the original (incorrect) item number. To properly return to the reset point, the activities completed after the reset point must be canceled to "undo" the changes caused by those activities.

Known systems for modeling processes are not capable of performing a loop reset to an intermediate activity within a process. It is therefore desirable to provide a process modeling system that is capable of performing a loop reset operation within a particular process, without requiring cancellation of the entire process.

SUMMARY OF THE INVENTION

The present invention provides a system for performing a loop reset operation to a previously performed intermediate activity within a particular process. Embodiments of the system described herein are capable of canceling one or more previously performed activities within a process to permit a loop reset to an intermediate activity. A loop reset to an intermediate activity allows a portion of the process to be repeated without restarting the entire process.

An embodiment of the invention provides a system for resetting a process from a first activity to a second activity, in which the second activity was previously performed. The system identifies activities that were previously performed after the second activity. Each identified activity (including the second activity) is executed in a cancel mode of operation. Additionally, the identified activities are executed sequentially from the first activity to the second activity. The system then executes the second activity in a run mode of operation.

In a particular embodiment of the invention, the cancel mode of operation cancels the changes implemented by a particular activity during a previous execution of the activity.

In another embodiment, each activity maintains information regarding the last change implemented by the activity. This information is used by the activity in the cancel mode of operation to cancel the last change implemented by the activity.

Other embodiments of the invention include a loop reset counter associated with the first activity and the second activity. The loop reset counter controls the number of loop resets that can occur from the first activity to the second activity.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIGS. 6A–6C illustrate an exemplary item activity status table used to execute the process shown in FIG. 2.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

Embodiments of the present invention provide a system for performing a loop reset operation to a previously performed intermediate activity within a particular process. The system described herein is capable of canceling one or more previously performed activities within a process to permit a loop reset to an intermediate activity. A loop reset to an intermediate activity allows a portion of the process to be repeated without restarting the entire process.

Figure 1:
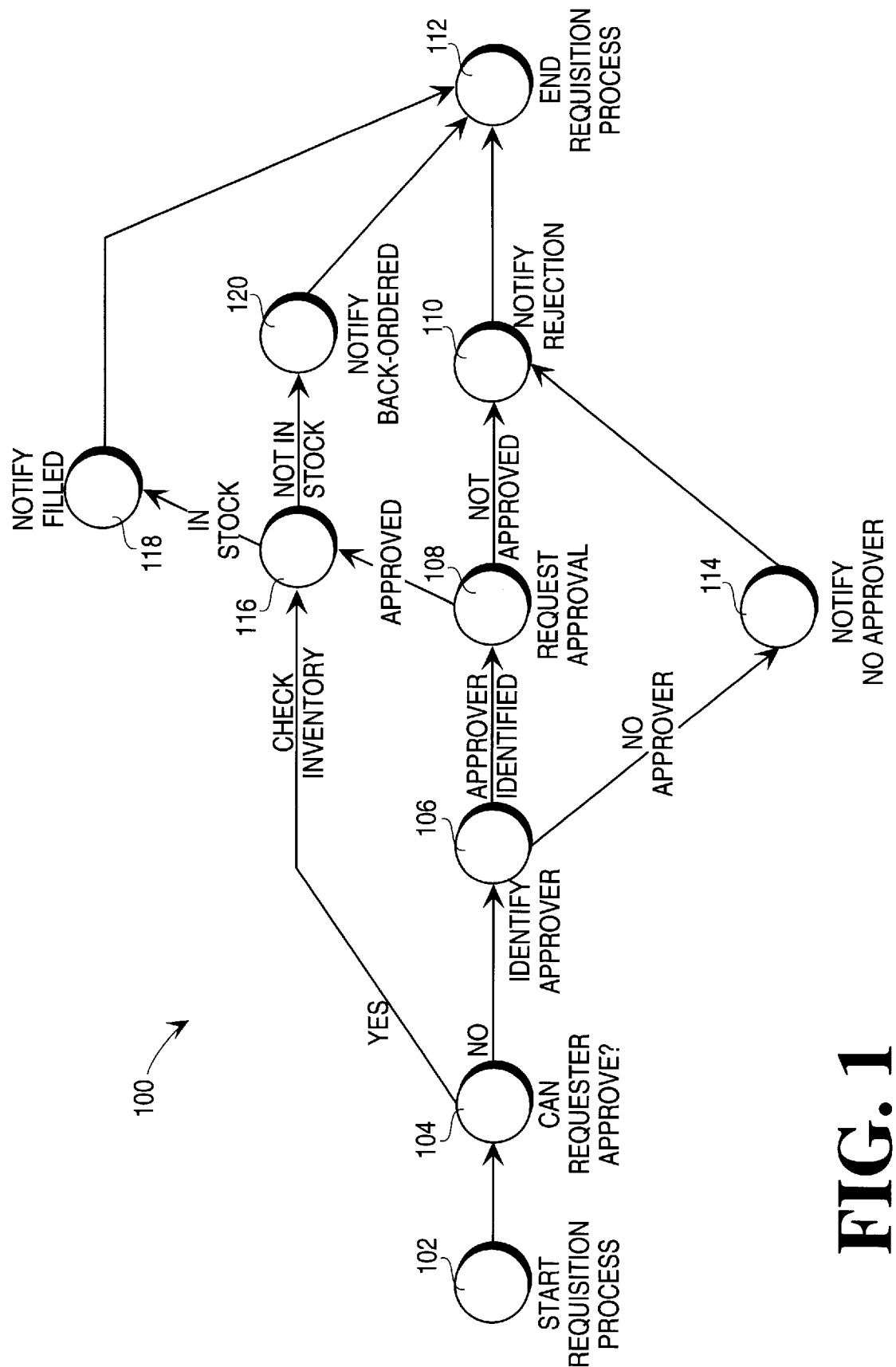
FIG. 1 illustrates an embodiment of a process for approving a requisition.

FIG. 1 illustrates an embodiment of a process 100 for approving a requisition. Process 100 may also be referred to as a "workflow." Process 100 includes a variety of activities (identified as circles) and transitions between the activities (identified as lines between the circles). The activities identify various operations to be performed by the process and the transitions identify the branches to be taken from one activity to another. The transitions between activities can be unconditional branches or conditional branches. An unconditional branch is followed after every execution of its preceding activity, and a conditional branch is followed only if a particular condition, usually established by execution of the preceding activity, is satisfied.

Process 100 begins at activity 102, referred to as "Start Requisition Process". Activity 102 is essentially a marker indicating to the process where to find the starting activity for the process. Activity 102 transitions to activity 104 (an unconditional branch), which determines whether the requester can self-approve the requisitioned item. If so, activity 104 transitions to activity 116 to check the inventory of the requisitioned item. If the requester cannot self-approve the requisitioned item, activity 104 transitions to activity 106 to identify an approver for the requisition. The transitions from activity 104 to activities 106 and 116 are examples of conditional branches.

If an approver is identified by activity 106, then the process transitions to activity 108 to request approval of the requisition. If the requisition is approved, the process transitions from activity 108 to activity 116 to check inventory of the requisitioned item. If activity 108 does not approve the requisition, the process transitions to activity 110 to notify the requester of the rejection.

If, at activity 106, no approver was identified, the process transitions to activity 114 to notify the requester that no approver was identified. The process then transitions from activity 114 to activity 110 to notify the requester of the rejection of the requisition. After the requester has been notified of the rejection by activity 110, the process transitions to activity 112, which ends the requisition process.

To execute Check Inventory Activity 116, the inventory is checked to determine whether the requisitioned item is currently in stock. If the item is in stock, the process transitions to activity 118 to notify the requester that the item is in stock and the requisition order has been filled. The process then transitions to activity 112 to end the requisition process. If, instead, activity 116 determines that the requisitioned item is not in stock, the process transitions to activity 120 to notify the requester that the requisitioned item has been back-ordered. The process then transitions to activity 112 to end the requisition process.

Figure 2:
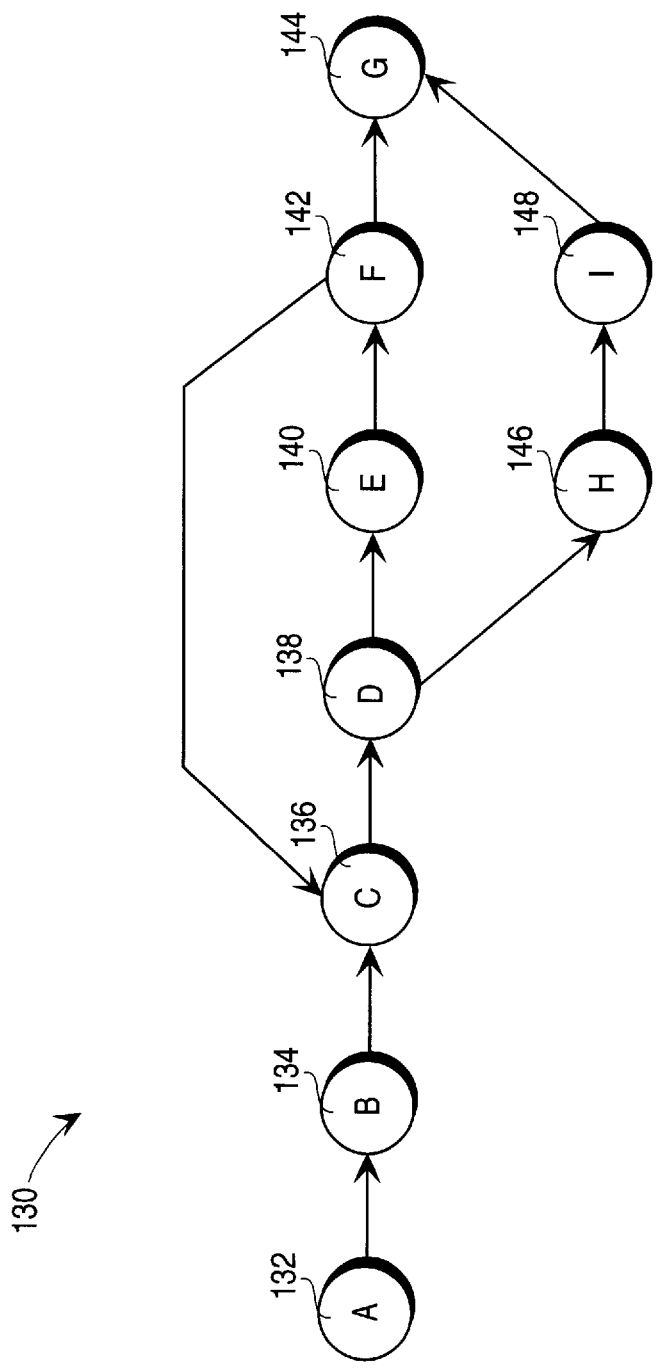
FIG. 2 illustrates an embodiment of a process having a possible loop reset to a previously performed activity.

FIG. 2 illustrates an embodiment of a process 130 having a "loop reset" transition to a previously performed activity. Process 130 begins at activity 132 and transitions to activity 134. After completing activity 134, the process transitions to activity 136, which then transitions to activity 138. Depending on the results of activity 138, process 130 transitions to activity 140 or transitions to activity 146. If the process transitions to activity 140, then the process continues to activity 142 upon the completion of activity 140. When activity 142 is completed, the process transitions to either activity 144 or activity 136, which was previously performed. For example, the process may transition to activity 144 if a requisition is approved, or return to activity 136 if the requisition is rejected. The transitioning from activity 142 back to activity 136 is referred to as a "loop reset." In this situation, activity 136 is referred to as the "reset point" (i.e., the point to which the process is reset).

In process 130, the loop reset causes the process to return to a previously performed activity (the reset point), repeat that activity, and continue from the reset point. For example, process 130 may transition from activity 142 to activity 136 and repeat activities 136, 138, 140, and 142, all of which were previously performed. Alternatively, from activity 136, the process may transition to activity 138, and branch to activity 146, followed by activity 148 and terminating at activity 144. Thus, the repeated activities do not necessarily follow the same transitions used during the previous execution of the activities.

When performing a loop reset operation, it is necessary to "undo" the activities that were previously performed after the reset point. For example, if the original process path transitioned from activity 136 to activities 138, 140, and 142, a loop reset from activity 142 to activity 136 would require the cancellation of any changes made by activities 136, 138, 140, and 142. Since the process is transitioning back to an earlier, previously performed activity, all changes or modifications performed by the previous activities must be canceled to reset the state of the process to its state when it first executed the reset point activity.

Embodiments of the present invention provide a mechanism for canceling the results of activities that have already been completed. It will be appreciated, however, that certain activities cannot be canceled. For example, the printing of a document cannot be canceled after the printing process is completed. Similarly, the sounding of an alarm or similar device cannot be canceled after the activity is performed. However, many other activities, such as those that control or process data, or transmit messages to various system components or system users, can be canceled. For example, if a particular activity changes an entry in a database, that change can be canceled by changing the database back to its previous value. In another example, if a particular message has already been transmitted to a system user, an additional message can be transmitted to the same system user indicating that the previous message should be disregarded.

Each process has an associated process definition, which contains information regarding the various activities in the process. For example, the process definition identifies all activities that may be executed by various paths within the process. The process definition also includes transition information which defines branches or transitions from one activity to another. Additionally, the process definition identifies any activities that can be reset points.

Each activity in a process includes logic or procedures for executing the activity in a run mode of operation and a cancel mode of operation. The run mode of operation is the typical or "normal" execution of the activity. The cancel mode of operation cancels or "un-performs" the changes implemented by an activity during a previous run mode execution of the activity. This canceling may include changing variables or data entries back to an earlier value before the variables or data entries were changed during the previous execution of the activity. Additionally, canceling an activity can include transmitting a message to a user or system component instructing the user or component to disregard the previous change. The type of operations required to cancel an activity will vary based on the type of activity. For example, an activity that changes data entries during the run mode of operation may save the previous data value (i.e., the value that was changed during the run mode) for use during a subsequent cancel operation.

A process engine executes process definitions and invokes the appropriate activity logic or procedures. The process engine controls transitions from one activity to another based on transition information contained in the process definition.

Figure 3:
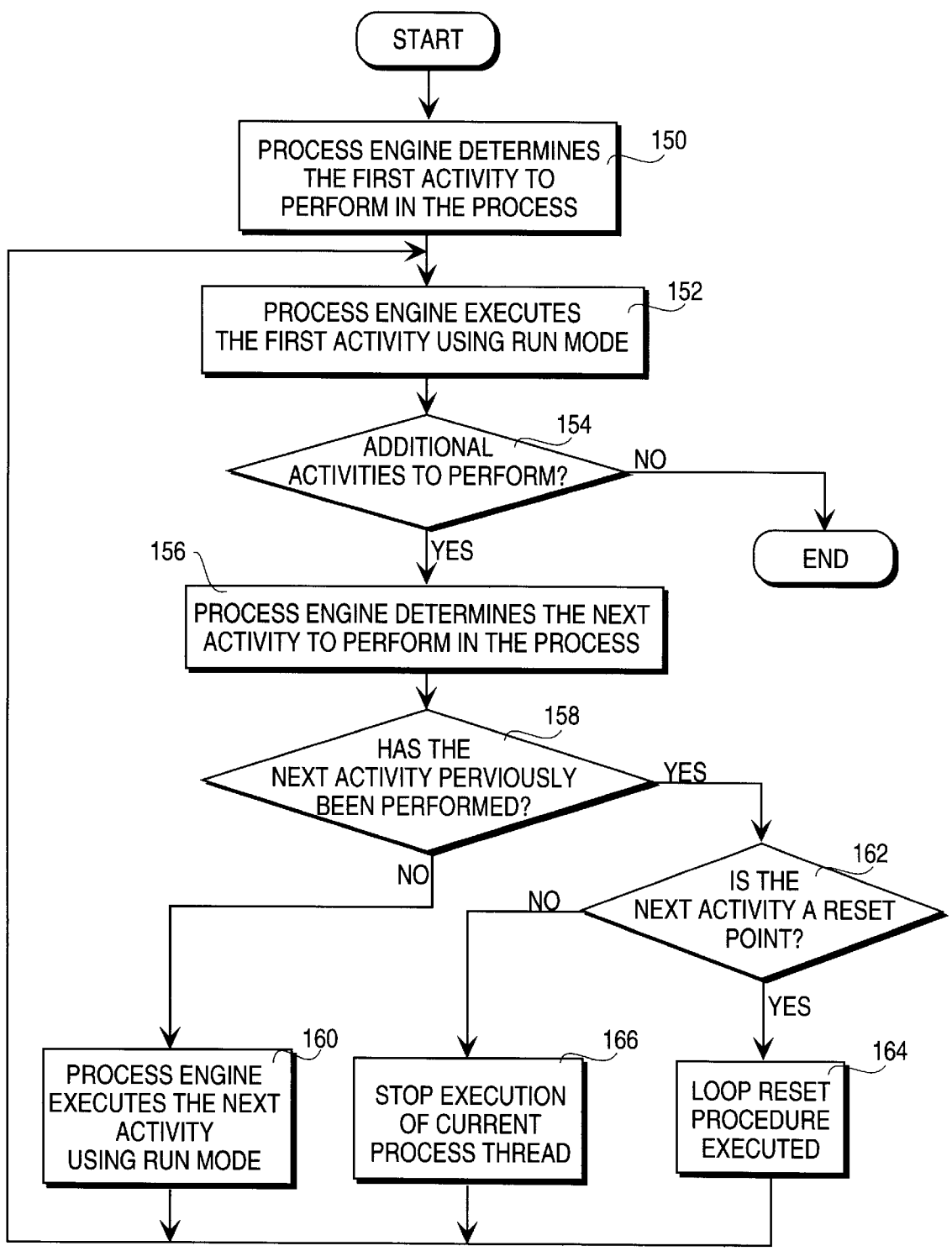
FIG. 3 is a flow diagram illustrating an embodiment of a procedure for executing a process.

FIG. 3 is a flow diagram illustrating an embodiment of a procedure for executing a process. At step 150, a process engine determines the first activity to perform in a particular process. For example, activity 102 in FIG. 1 and activity 132 in FIG. 2 are the first activities to perform in their respective processes. At step 152, the process engine executes the first activity using a run mode of operation. As mentioned above, the run mode of operation represents the typical or "normal" execution of the activity.

Step 154 of FIG. 3 determines whether additional activities remain to be performed in the process. If no activities remain, the process terminates. If additional activities remain to be performed, the procedure continues to step 156 where the process engine determines the next activity to be performed in the process. As discussed in greater detail below, this determination may utilize a process activity transition table to identify the next activity based on the results of the current activity, or previous activities.

Step 158 then determines whether the next activity (identified at step 156) has previously been performed. If not, the procedure continues to step 160 where the process engine executes the next activity using the run mode of operation. If step 158 determines that the next activity has previously been performed, then step 162 determines whether the next activity is a reset point. As discussed above, a reset point is the activity to which a loop reset returns. If the next activity is a reset point, then the procedure continues to step 164 where a loop reset procedure is executed. Additional details regarding the loop reset procedure are provided below. If the next activity identified at step 162 is not a reset point, then the procedure continues to step 166 where the execution of the current process thread is terminated. A process thread refers to a particular path being followed by the process. If an activity transitions to multiple parallel paths, then a process thread is created for each path.

In the example of FIG. 2, if activity 142 identifies that the next activity is activity 136, and activity 136 has already been performed, then activity 142 will determine whether activity 136 is a reset point. The determination of whether a particular activity is a reset point can be performed using an activity status table or an activity transition table, both of which are discussed below. If activity 136 is a reset point, then the previously executed activities after (and including) the reset point are canceled by the process engine. Thus, in the example of FIG. 2, activities 136, 138, 140, and 142 are canceled by the process engine. Once the activities have been canceled, the process can continue by executing activity 136 using its "normal" run mode of operation. The process then transitions to activity 138 and continues in the manner previously discussed.

Figure 4:
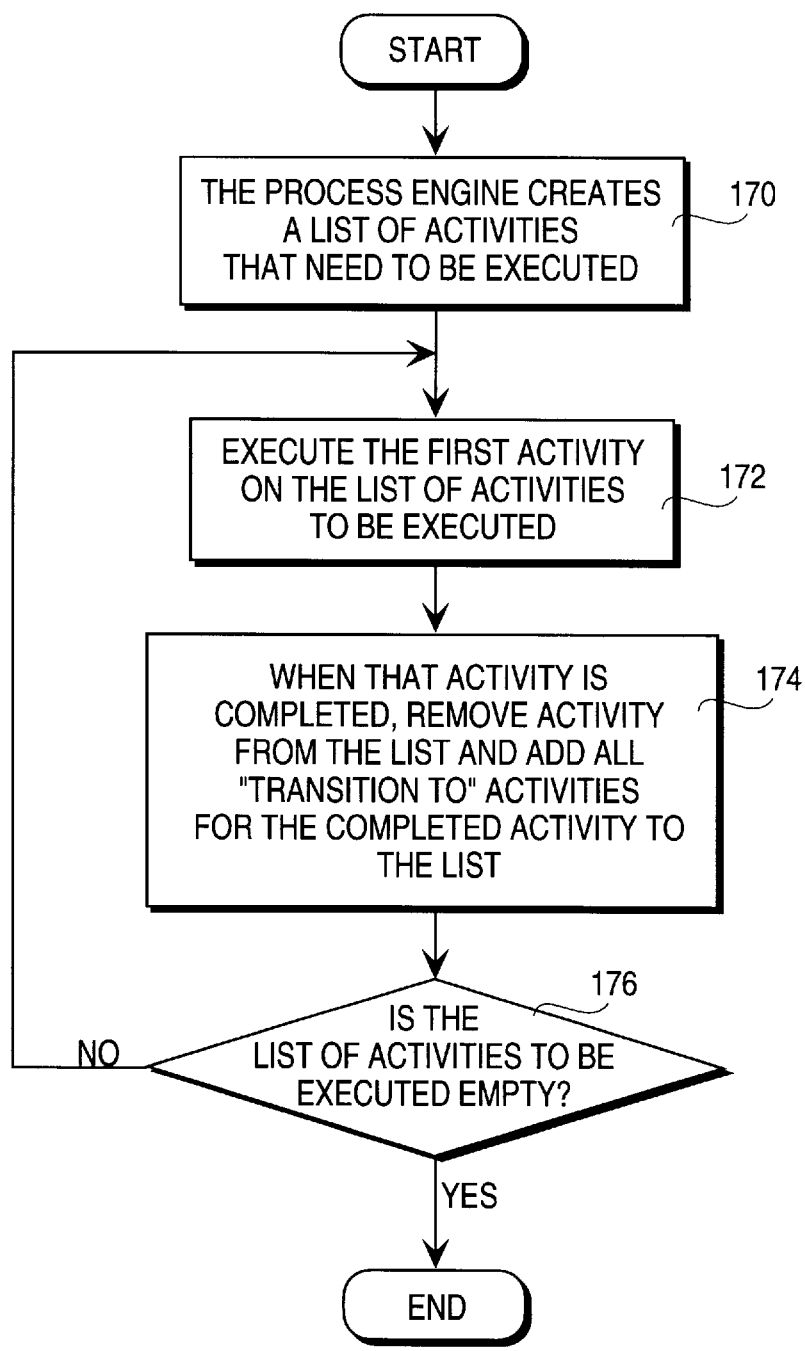
FIG. 4 is a flow diagram showing an embodiment of a procedure for transitioning between activities in a process.

FIG. 4 is a flow diagram showing an embodiment of a procedure for transitioning between activities in a process. At step 170, the process engine creates a list of activities that need to be executed. In one embodiment of the invention, this list of activities is limited to the activities that are within a single transition of the current activity. The activities on the list can be maintained, for example, in global variables within the system.

In the example of FIG. 2, the starting activity is activity 132. Thus, when the process engine executes activity 132, the list of activities will include activity 134 since it is the only activity that can be "transitioned to" from activity 132.

After the list of activities is created at step 170, the procedure continues to step 172 to execute the first activity on the list of activities to be executed. At step 174, after the activity is completed, the activity is removed from the list and all "transition to" activities for the completed activity are added to the list. For example, when activity 134 in FIG. 2 is completed, activity 136 is added to the list. When activity 136 is completed, activity 138 is added to the list. When activity 138 is completed, activity 140 and activity 146 are added to the list. If an activity transitions to two or more parallel paths, multiple activities are added to the list (one activity for each of the parallel paths).

At step 176 of FIG. 4, the procedure determines whether the list of activities to be executed is empty. If the list is not empty (i.e., additional activities remain to be executed), then the procedure returns to step 172 to execute the first activity on the list. If the list is empty at step 176, then the procedure terminates, having executed all activities in the process.

Figure 5:
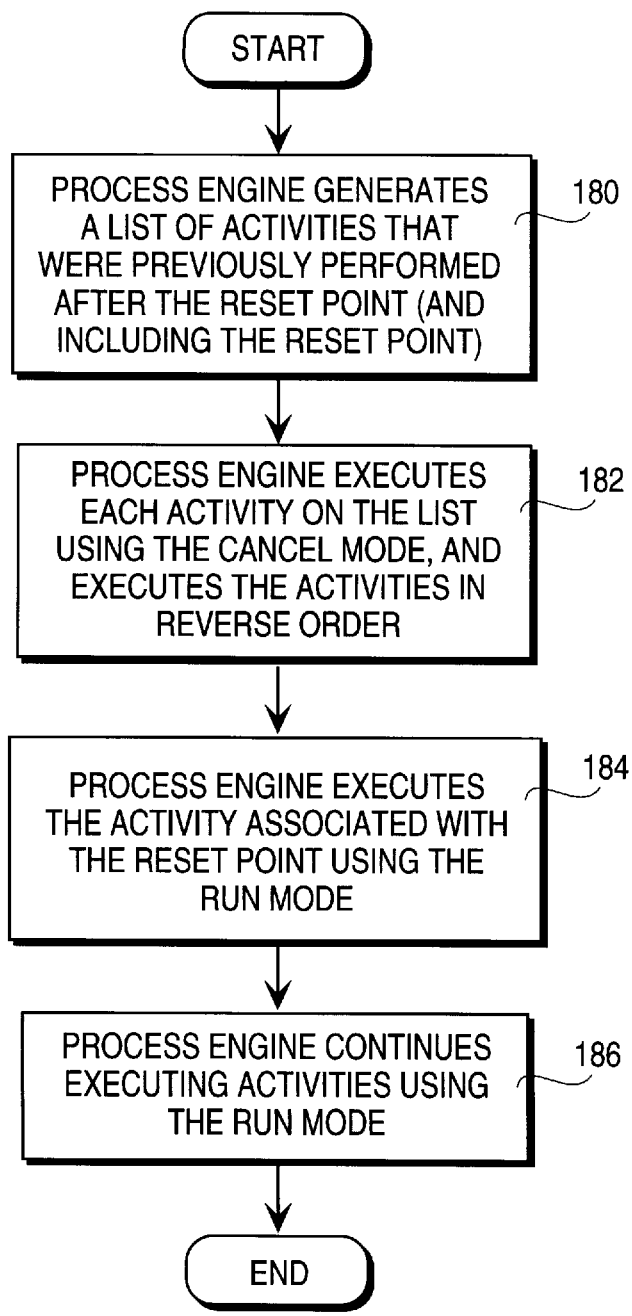
FIG. 5 is a flow diagram illustrating an embodiment of a procedure for canceling previously executed activities between a current activity and a reset point.

FIG. 5 is a flow diagram illustrating an embodiment of a procedure for canceling previously executed activities between a current activity and a reset point. At step 180, the process engine generates a list of activities that were previously performed after (and including) the reset point. This list is generated using information contained in an activity status table, which is discussed in greater detail below with respect to FIGS. 6A–6C. The activity status table contains information regarding the various activities in a process and the status of each activity. Additionally, the activity status table contains activity result information for completed activities. The process engine generates the list in step 180 by beginning with the reset point and listing all transitions that occurred after the reset point was executed, until the current activity is reached. The process definition is used to determine which transitions were followed for activities that have multiple transitions.

The list generated at step 180 includes both the reset point itself and the current activity. In the example of FIG. 2, the list will include activities 136, 138, 140, and 142 if those were the activities executed after the reset point (activity 136). At step 182 of FIG. 5, a process engine executes each activity on the list using a cancel mode of operation.

The cancel mode of operation performs a different operation than the run mode of operation for a particular activity. As discussed above, the cancel mode of operation cancels or "un-performs" the changes implemented by the activity during the previous execution. This canceling may include changing variables or data entries back to an earlier value before the variables or data entries were changed during the previous execution of the activity. The type of operations required to cancel an activity will vary based on the type of activity.

The execution of the activities on the list in step 182 is performed in reverse order. This is necessary to properly "undo" the changes implemented during the previous executions of the activities. Thus, referring to the process of FIG. 2, the previously executed activities would be canceled in the following order: cancel activity 142, cancel activity 140, cancel activity 138, and cancel activity 136.

At step 184 of FIG. 5, the process engine executes the activity associated with the reset point using the run mode of operation. At this point, the reset point has already been executed in cancel mode, thereby "undoing" any changes made by the activity during the previous execution. Thus, the reset point activity is executed in run mode as if it was never executed previously. At step 186 of FIG. 5, the process engine continues executing activities using the run mode of operation.

For example, although the initial execution of process 130 in FIG. 2 may have followed activities 136, 138, 140, and 142 before transitioning back to activity 136, the next time activity 138 is executed, the process may transition to activity 146 followed by a transition to activities 148 and 144. Thus, a loop reset does not require that the process follow the same path previously executed.

FIGS. 6A–6C illustrate an exemplary item activity status table 190 used during the execution of a process. The particular entries in the tables of FIGS. 6A–6C refer to the process shown in FIG. 2. Item activity status table 190 includes process name entries 192, process instance entries 194, and process activity entries 196. The process name is the name of the process being executed. The process instance identifies the particular instance of the process being executed. The process activity entry identifies the particular activity within the instance of the process for which status information is provided.

An activity status entry 198 identifies the status of the activity (e.g., completed or not completed) and an activity result 200 identifies the result of the execution of the activity. Activity result 200 entries identify a particular path taken by the process when two or more possible paths are available. Table 190 also includes error entries 202, which indicate errors that occurred during execution of the activity.

The table shown in FIG. 6A illustrates the entries in item activity status table 190 after the process shown in FIG. 2 has completed activity 140 (also referred to as activity E). At this point, process 130 has completely executed activities A, B, C, D, and E in the run mode of operation, as indicated by the activity status entries 198. An activity result entry 200 for process activity D indicates that the result of activity D was "Approver Identified." This result causes the process shown in FIG. 2 to transition from activity D to activity E.

FIG. 6B illustrates the same item activity status table 190 after performing a loop reset operation from activity F to activity C (FIG. 2). Thus, table 190 shows that activities F, E, D, and C were canceled as a result of the loop reset. When a previously performed activity is canceled, its activity status in table 190 is changed to "Not Performed", as shown in FIG. 6B. After canceling activities F, E, D, and C, the process continues by executing activity C in run mode, and continues transitioning to subsequent activities.

FIG. 6C illustrates activity status table 190 after the activity shown in FIG. 2 has terminated. Table 190 shows that activities A–G were completed with the result of activity D being "Approver Identified" and the result of activity F being "Requisition Approved." Activities H and I were not performed because activity D transitioned to activity E instead of activity H.

Figure 7:
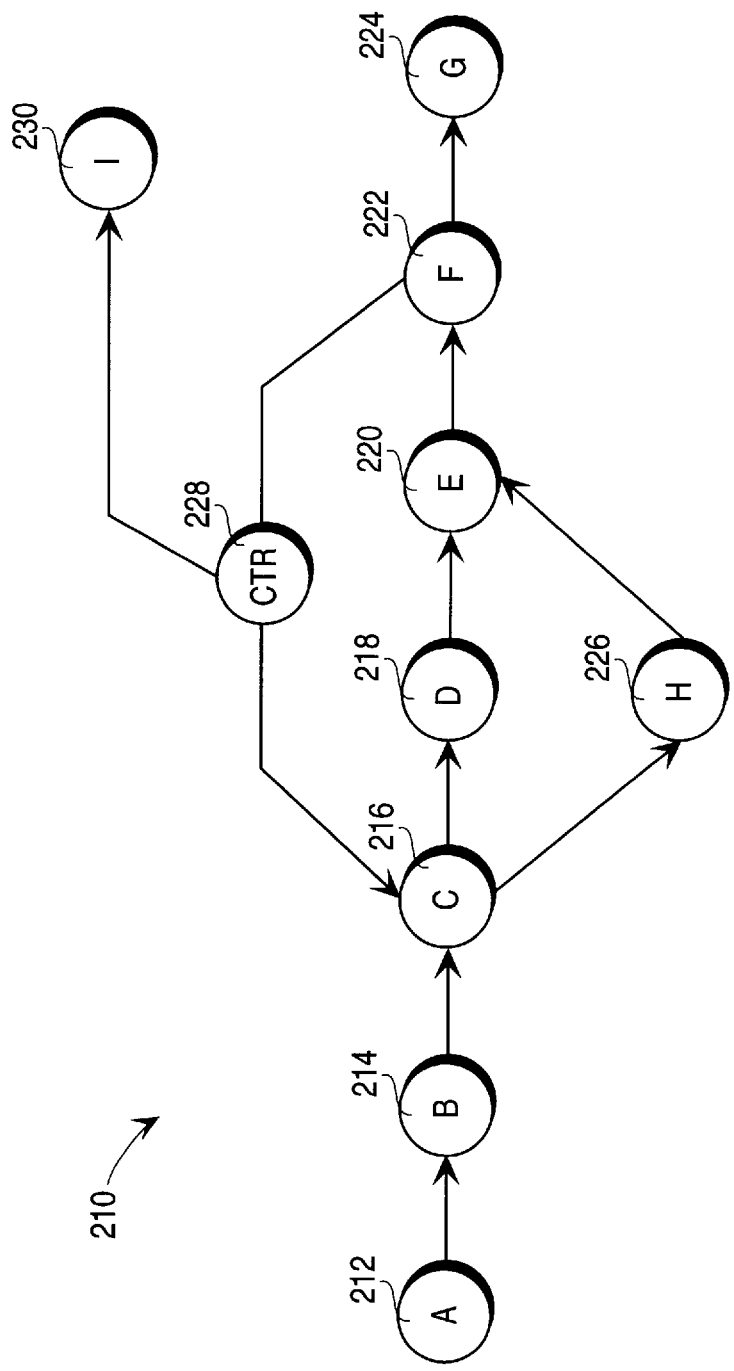
FIG. 7 illustrates another embodiment of a process having a possible loop reset and a loop reset counter.

FIG. 7 illustrates another embodiment of a process 210 having a loop reset that includes a loop reset counter. Process 210 contains multiple activities 212, 214, 216, 218, 220, 222, and 224 which form a path from the starting activity 212 to the ending activity 224. A parallel path exists between activities 216 and 220, and flows through activity 226, thereby bypassing activity 218. Process 210 also includes a loop reset from activity 222 to activity 214 through a loop reset counter 228. Each time a loop reset is initiated by activity 222, the process first transitions to loop reset counter 228. Loop reset counter 228 maintains a count of the number of executions of the loop reset from activity 222 to activity 214. If the counter reaches a particular maximum value, then the process branches to activity 230, rather than returning to activity 214. Loop reset counter 228 prevents the generation of infinite loops and terminates the process using activity 230. Loop reset counter 228 can be implemented as an activity using the procedures discussed herein.

Alternatively, loop reset counter 228 may be used to generate a notification, alarm, or other message after the counter value exceeds a particular threshold. In this situation, the loop reset continues to occur and process 210 continues to execute activities, but a warning or notification is provided to a person or entity which can then investigate the repetitive loop reset operations of the process.

Figure 8:
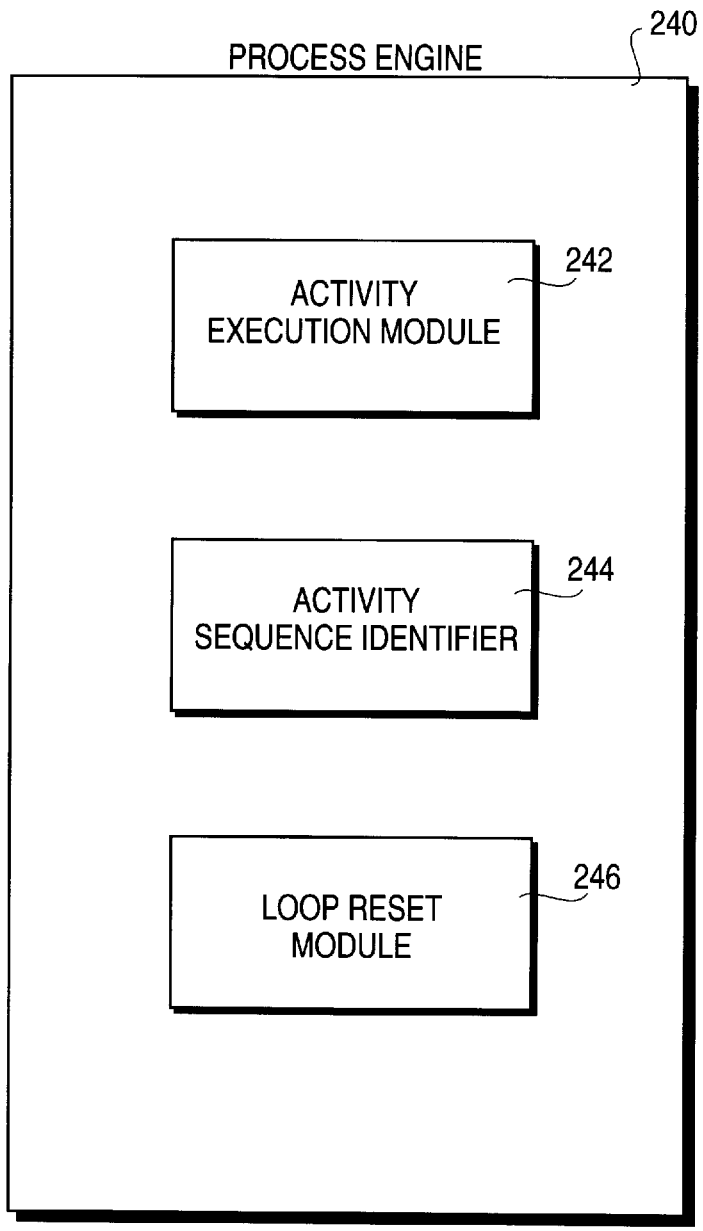
FIG. 8 illustrates an embodiment of a process engine capable of implementing the teachings of the present invention.

FIG. 8 illustrates an embodiment of a process engine 240 capable of implementing the teachings of the present invention. Process engine 240 includes an activity execution module 242, which is capable of executing or controlling the execution of the various activities in a process, including both a run mode of operation and a cancel mode of operation. An activity sequence identifier 244 controls the sequence in which activities are executed using, for example, information contained in a process activity transition table (not shown). A loop reset module 246 controls the operation of a loop reset from one activity to a previously performed activity. This control includes the identification of previously performed activities using, for example, an item activity status table of the type discussed above with respect to FIGS. 6A–6C. Loop reset module 246 may also control the canceling of previously performed activities. Process engine 240 uses information contained in process definitions and the process name table to execute various activities. Additionally, process engine 240 uses the process activity transition table, which contains information necessary to identify one or more transitions from one activity to another. The process activity transition table identifies the requirements necessary for a conditional branch (for activities having multiple transitions) and identifies unconditional branches between activities (for activities having a single transition).

Figure 9:
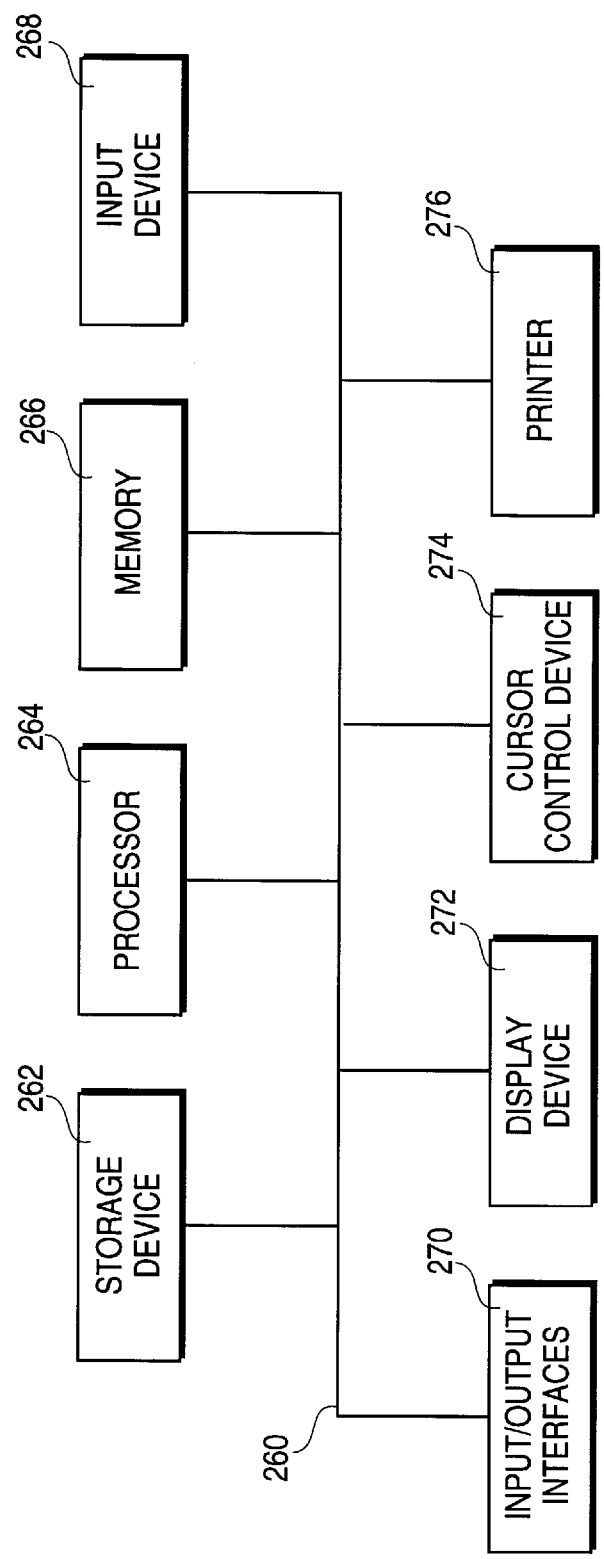
FIG. 9 illustrates an embodiment of a processor-based system capable of operating as a process engine.

FIG. 9 illustrates an embodiment of a processor-based system capable of operating as a process engine. A storage device 262 is coupled to a processor 264 using a bus 260. Storage device 262 may be any type of storage device, including a magnetic storage device or an optical storage device. A memory 266 is coupled to processor 264 and may include various types of memory, such as random access memory (RAM), read-only memory (ROM), cache memories, and other memory storage devices. An input device 268 is coupled to processor 264 and provides a mechanism for entering information into the processor-based system.

One or more input/output interfaces 270 are coupled to processor 264 and permit the communication of information to or from external devices coupled to interface 270. Interface 270 allows these external devices to communicate with processor 264 and the other components of the processor-based system shown in FIG. 9. A display device 272 provides a mechanism for displaying information generated by or stored in the system. A cursor control device 274 is used to select and otherwise manipulate information, for example, in a graphical environment. A printer 276 is also coupled to processor 264 and is capable of producing a hard copy of information stored in or generated by the processor-based system.

Although FIG. 9 illustrates various system components coupled to a single bus or communication link, it will be appreciated that a particular processor-based system may include multiple buses and multiple communication links between various components of the system.

Embodiments of the present invention may include code sequences, instructions, parameters, and other information stored on a processor-readable medium (also referred to as a computer-readable medium). The code sequences, instructions, parameters, and other information are used to perform various data processing and data management operations, such as the procedures described above. The processor-readable medium may be any type of magnetic, optical, or electrical storage medium including a disk, diskette, CD-ROM, memory device, or similar storage medium.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of resetting a process from a first activity to a second activity, wherein the second activity was previously performed, the method comprising the steps of:

a) identifying activities that were previously performed after the second activity, wherein the identified activities include the second activity;

b) executing each activity identified in step (a) in a cancel mode of operation, wherein the activities are executed sequentially from the first activity to the second activity; and c) executing the second activity in a run mode of operation.

2. The method of claim 1 wherein the previously performed activities identified in step (a) include the first activity.

3. The method of claim 1 wherein step (b) executes the activities identified in step (a) in an order opposite the order in which the activities were previously performed.

4. The method of claim 1 wherein the cancel mode of operation cancels the changes implemented by a particular activity during a previous execution of the activity.

5. The method of claim 1 where in each activity maintains information regarding a last change implemented by the activity, and wherein this information is used by the activity in the cancel mode of operation to cancel the last change implemented by the activity.

6. The method of claim 1 wherein an activity status table is used in step (a) to identify previously performed activities.

7. The method of claim 6 further including the step of updating the activity status table after executing an activity.

8. The method of claim 1 wherein the second activity has an associated attribute indicating that the second activity is a loop reset point.

9. The method of claim 1 further including a loop reset counter associated with the first activity and the second activity, wherein the loop reset counter controls the number of loop resets that can occur from the first activity to the second activity.

10. A method of performing a process having a plurality of activities, the method comprising the steps of:

a) identifying and executing a first activity;

b) identifying a second activity to be executed;

c) executing the second activity in a run mode of operation if the second activity has not been previously performed; and d) performing a loop reset operation if the second activity has been previously performed and the second activity is identified as a loop reset point, wherein the loop reset operation cancels the changes implemented during the previous execution of the second activity and cancels the changes implemented by activities previously performed after the second activity.

11. The method of claim 10 further including the step of repeating steps (b), (c), and (d) for each subsequent activity to be executed.

12. The method of claim 10 wherein each activity maintains information regarding a last change implemented by the activity, and wherein this information is used during the loop reset operation to cancel the last change implemented by the activity.

13. The method of claim 10 wherein an activity status table is used to identify previously performed activities.

14. The method of claim 13 further including the step of updating the activity status table after executing an activity.

15. The method of claim 10 further including a loop reset counter associated with the loop reset operation, wherein the loop reset counter controls the number of loop reset operations that can occur between a particular pair of activities.

16. A process engine comprising:

an activity sequence identifier configured to identify the next activity in the process to be executed;

an activity execution module coupled to the activity sequence identifier and configured to execute the next activity identified by the activity sequence identifier, wherein the activity execution module is configured to execute activities in a run mode of operation or a cancel mode of operation; and a loop reset module coupled to the activity execution module and configured to cancel changes implemented during previous executions of process activities, wherein the loop reset module is activated in response to the identification of a previously executed activity by the activity sequence identifier.

17. The process engine of claim 16 wherein the loop reset module is configured to cancel previously executed activities in an order opposite the order in which the activities were previously executed.

18. The process engine of claim 16 wherein the previously executed activities are canceled by instructing the activity execution module to execute the previously executed activities in the cancel mode of operation.

19. The process engine of claim 16 wherein the loop reset module uses an activity status table to identify previously performed activities.

20. The process engine of claim 19 wherein the activity status table is updated by the activity execution module after each activity is executed.

21. A computer-readable medium having stored thereon a sequence of instructions which, when executed by the processor, causes the processor to:
- identify activities that were previously performed in a particular process between a first activity and a second activity, wherein the second activity was previously performed;
- execute each of the identified activities in a cancel mode of operation, wherein the identified activities are executed sequentially from the first activity to the second activity; and
- execute the second activity in a run mode of operation.

22. The computer-readable medium of claim 21 wherein the identified activities include the first activity and the second activity.

23. The computer-readable medium of claim 21 wherein the cancel mode of operation cancels the changes implemented by a particular activity during a previous execution of the activity.

24. The computer-readable medium of claim 21 wherein the second activity has an associated attribute indicating that the second activity is a loop reset point.

* * * * *